United States Patent [19]

Fuchs et al.

[11] Patent Number: 4,498,397
[45] Date of Patent: Feb. 12, 1985

[54] CONVEYOR TRANSFER MECHANISM

[75] Inventors: Gilbert Fuchs; Norman Crowley; Randall Wink, all of Evansville, Ind.

[73] Assignee: Evana Tool & Engineering Inc., Evansville, Ind.

[21] Appl. No.: 4 ,816

[22] Filed: Aug. 17, 1982

[51] Int. Cl.³ .......................... B61J 1/02; B61B 13/12
[52] U.S. Cl. ....................................... 104/35; 104/21; 104/166; 198/472
[58] Field of Search ....................... 104/21, 35, 36, 38, 104/49, 99, 163, 165, 166; 198/472, 580

[56] References Cited

U.S. PATENT DOCUMENTS

| | | | |
|---|---|---|---|
| 1,353,929 | 9/1920 | Maynes | 104/163 X |
| 1,857,852 | 5/1932 | McGuldrick | 104/35 |
| 3,603,262 | 9/1971 | Wiklund | 104/35 |
| 3,858,625 | 1/1975 | Ribordy | 104/166 |
| 4,041,873 | 8/1977 | Jones | 104/166 X |
| 4,048,923 | 9/1977 | Giraud | 104/165 X |
| 4,355,581 | 10/1982 | Mitani | 104/166 |

FOREIGN PATENT DOCUMENTS

| | | | |
|---|---|---|---|
| 1267699 | 5/1968 | Fed. Rep. of Germany | 104/35 |
| 785133 | 12/1980 | U.S.S.R. | 104/35 |

*Primary Examiner*—Randolph Reese
*Attorney, Agent, or Firm*—Larson and Taylor

[57] ABSTRACT

A transfer mechanism for transferring a pallet from a first trackway to a second trackway is disclosed. Each trackway includes an inside track and an outside track. Preferably, the outside tracks of each trackway are connected by an arcuate connecting track. A transfer device moves the pallet from the end of the first trackway to the adjacent end of the second trackway. The transfer device includes a turntable having a track portion thereon, preferably, an inside track portion. By rotating the turntable, the track portion is first presented adjacent the end of the first trackway so that the pallet is received on the track portion. The turntable is then rotated and carries the pallet to the end of the second trackway to which the pallet is then transferred. The track portion can extend continuously around the turntable and the turntable rotated constantly so that a pallet is transferred as soon as the pallet reaches the transfer mechanism. Alternatively, a plurality of track portions can be located around the turntable and the turntable indexed to sequentially move a pallet received on a track portion. In between sequential movements, work stations located along the path of movement can perform work on objects located on the pallets.

30 Claims, 12 Drawing Figures

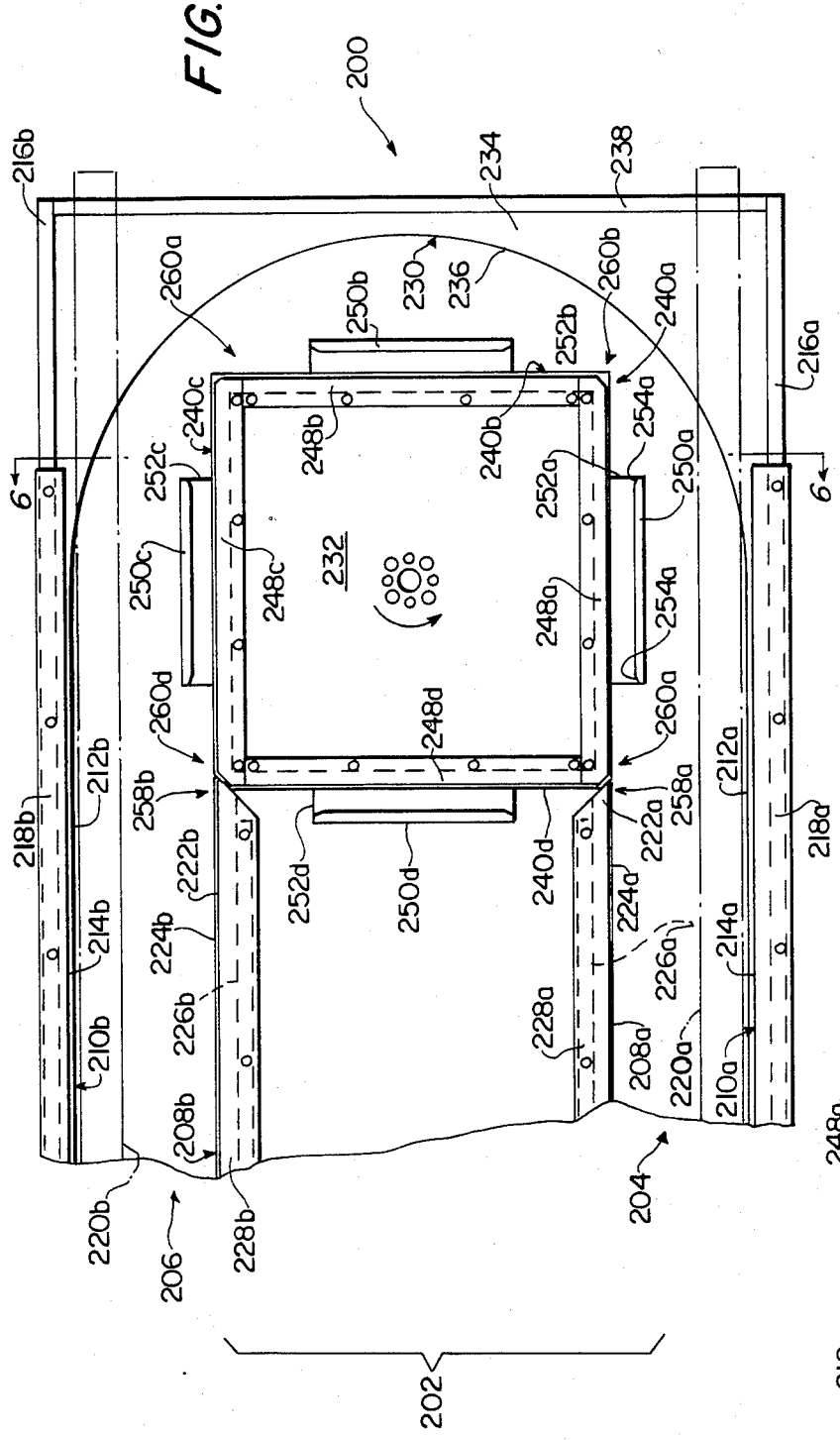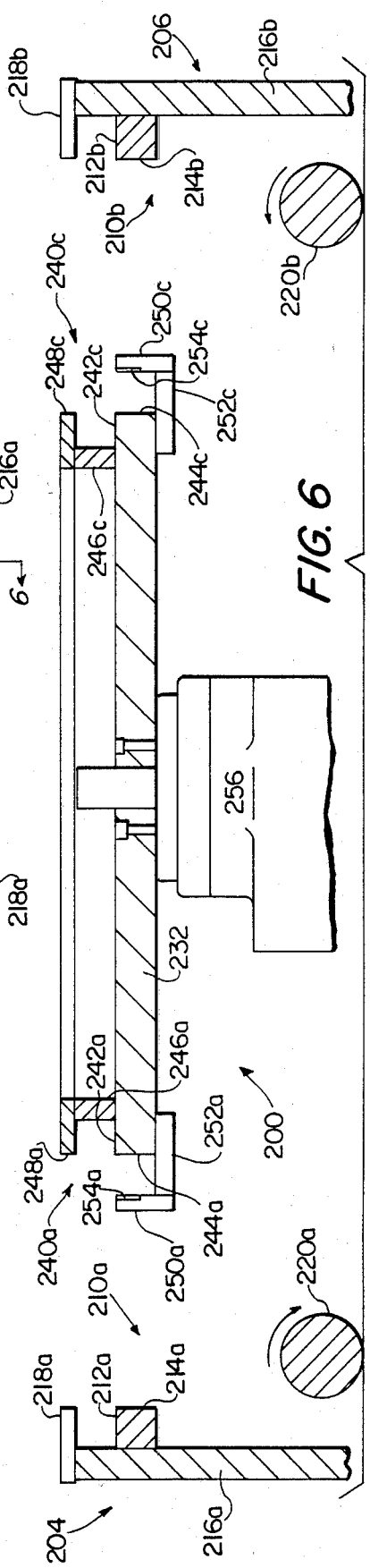

CONVEYOR TRANSFER MECHANISM

FIELD OF THE INVENTION

The present invention relates generally to a transfer mechanism for moving a pallet from a first conveyor trackway to a second conveyor trackway, and more particularly to a transfer mechanism having a turntable with a track portion and an arcuate connecting track.

BACKGROUND OF THE INVENTION

Conveying systems for moving a pallet along a trackway have been disclosed in the prior art. More particularly, conveying systems utilizing a rotating drive shaft and a contacting drive wheel to move a pallet along a trackway have also been disclosed in the prior art. Typical of such devices are those disclosed in the following U.S. Pat. Nos.: 3,356,040 (Fonden); and 3,118,393 (Ohlin).

As the pallet is conveyed along a trackway, it is frequently desired to transfer the pallet to a second trackway. In order to accomplish this transfer, a number of transfer mechanisms have been disclosed in the prior art. Typically, these devices utilize a turntable apparatus as shown in the following U.S. Pat Nos.: 3,858,626 (Ribordy), 3,858,707 (Block et al), and 3,866,537 (Minkwitz). A similar device is also disclosed in West German Pat. No. 1,259,779 dated Jan. 25, 1968.

SUMMARY OF THE INVENTION

In accordance with the present invention, a transfer mechanism for a conveying system having a first trackway and a second trackway is disclosed. Each trackway includes an inside track and an outside track having a top surface and a lateral surface. A pallet is mounted for longitudinal movement on the tracks of a trackway. The pallet includes three top rollers which engage the top surfaces of the inside and outside tracks to vertically support the pallet and three lateral rollers which engage the lateral surfaces of the inside or outside track and which position the pallet laterally on the trackway. An arcuate connecting track is also provided for connecting one of the inside track or outside track of the first trackway with the similar track of the second trackway. This arcuate connecting track also includes a top surface and a lateral surface. The pallet is driven along the first trackway by a first drive means to the transfer end of the first trackway and a second drive means is provided for driving the pallet away from the receiving transfer end of the second trackway. A transfer means for moving the pallet from the transfer end of the first trackway to the receiving transfer end of the second trackway includes a turntable with a track portion of the other of the inside track or outside track disposed about the axis of rotation of the turntable. The track portion includes a top surface and a lateral surface which are located on the turntable such that the track portion is positioned by rotation of the turntable adjacent the transfer end of the other track of the first trackway and subsequently of the second trackway. A rotating means is also provided for rotating the turntable to cyclically present the track portion of the turntable to the transfer ends of the first and second trackway.

In one embodiment of the present invention, the turntable includes a plurality of track portions disposed equidistantly around the axis of rotation. The rotating means also includes an index means for rotatably indexing the turntable so that each track portion is sequentially presented to the transfer end of the first trackway and subsequently to the transfer end of the second trackway. In addition, the transfer means further includes a stop means for stopping the pallet on the presented track portion of the turntable at the transfer end of the first trackway and a start means for engaging the pallet to the second drive means after the pallet has been moved around the arcuate track by the indexing movement of the turntable to the transfer end of the second trackway.

In a preferred embodiment of the present invention, the arcuate track connects the first outside track with the second outside track and the turntable includes a plurality of inside track portions. In addition, the first trackway and the second trackway are parallel and the arcuate track is semicircular. In order to limit the lateral movement of the pallet as it is transferred by the turntable, a curve means is provided adjacent the lateral surface of each track portion.

In order to assure that a pallet is not moved until it is properly positioned on the track portion of the turntable, a suitable control means is provided. Where a plurality of pallets are located on the first trackway, the control means further includes an escapement means for stacking the pallets adjacent the upstream side of the transfer end and for releasing one pallet at a time when an empty track portion is presented.

In order to mount the pallet laterally, three lateral wheels are used. Preferably, two of the lateral wheels engage the lateral surface of the inside track. A preferred drive means for the pallet includes a first rotating cylindrical drive shaft disposed underneath and parallel to the first trackway and a similar second rotating drive shaft disposed underneath and parallel to the second trackway. Mounted to the pallet is a drive roller which rotatably contacts an adjacent cylindrical drive shaft causing the pallet to move. Preferably, an axial face of the drive roller contacts the drive shaft. With this type of drive means, the stop means includes a first cam which rotates the drive roller to a neutral position and the start means includes a second cam for rotating the drive roller to the drive position.

In a second preferred embodiment of the present invention, the track portion of the turntable extends completely around the axis of rotation of the turntable so that a portion of the track portion is continuously presented to the transfer ends of the first trackway and second trackway. Preferably, the track portion is an inside track which is located around the periphery of the turntable. By continuously rotating the turntable, a pallet is immediately transferred by the transfer means from the first trackway to the second trackway as soon as the pallet reaches the transfer end of the first trackway. A stationary curve means can also be provided for limiting the lateral movement of the lateral wheel, or preferably the two lateral wheels, of the pallet adjacent the lateral surface of the track portion. Preferably, a first drive means and a second drive means using a rotating cylinder and a drive roller with an axial face is also used to drive the pallet.

The transfer mechanism according to the present invention provides a reliable and relatively simple transfer mechanism for transferring a pallet from one trackway to another. In addition, where the pallet is indexed from one trackway to another, work stations can be provided at the indexing stop positions of the transfer mechanism so that further operations can be provided on an object carried on the pallet. Other features and advantages of the present invention are stated in or are apparent from a detailed description of presently preferred embodiments of the invention found hereinbelow.

BRIEF DESCRIPTION OF THE DRAWINGS

FIG. 5 is a top plan view of a transfer mechanism according to the present invention.

FIG. 6 is a cross-sectional elevation view of the turntable depicted in FIG. 5 taken along the line 6—6.

DETAILED DESCRIPTION OF THE PREFERRED EMBODIMENTS

Figure 1:
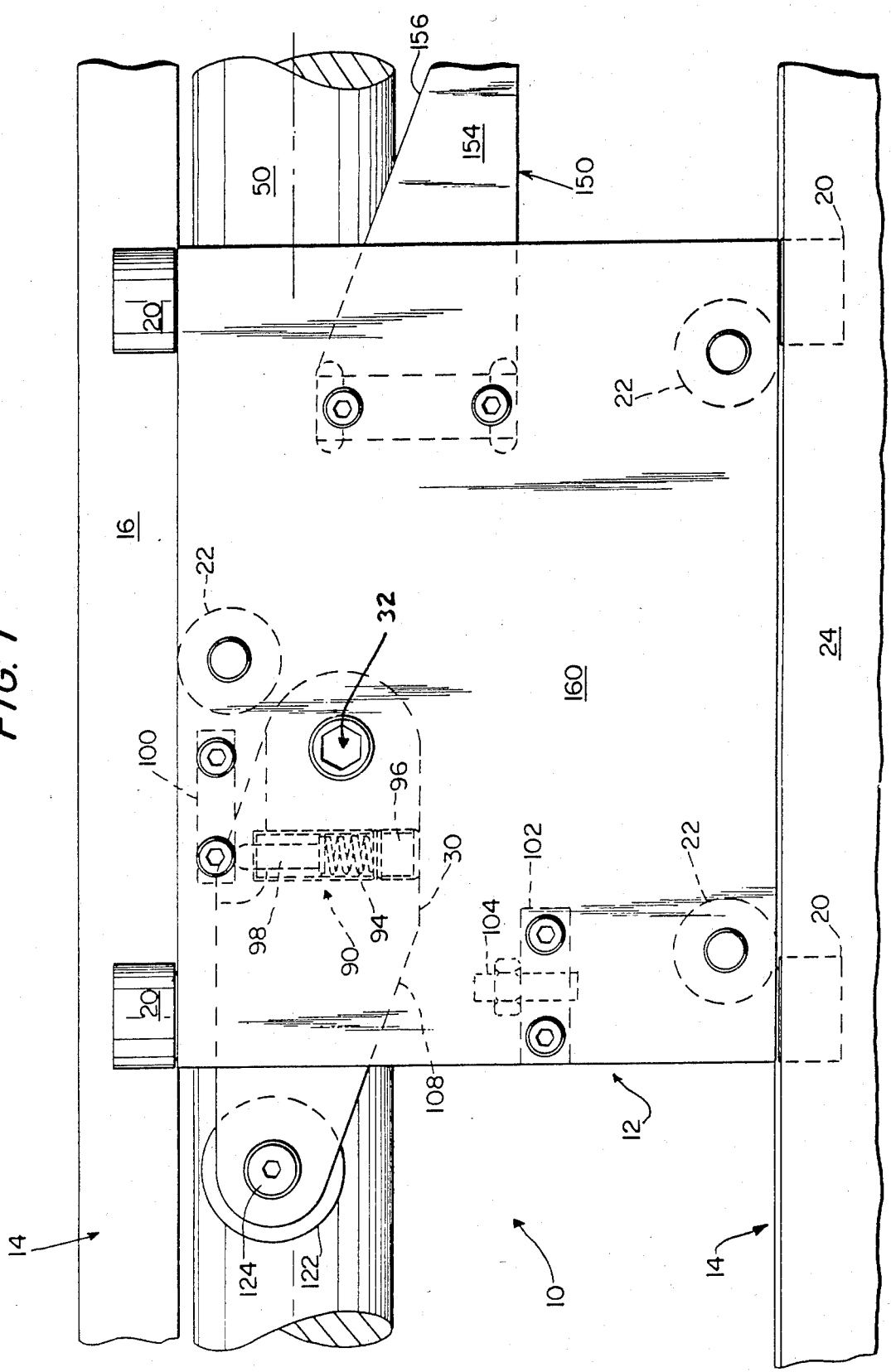
FIG. 1 is a top plan view of a conveying system for a pallet on a trackway according to the present invention.
Figure 2:
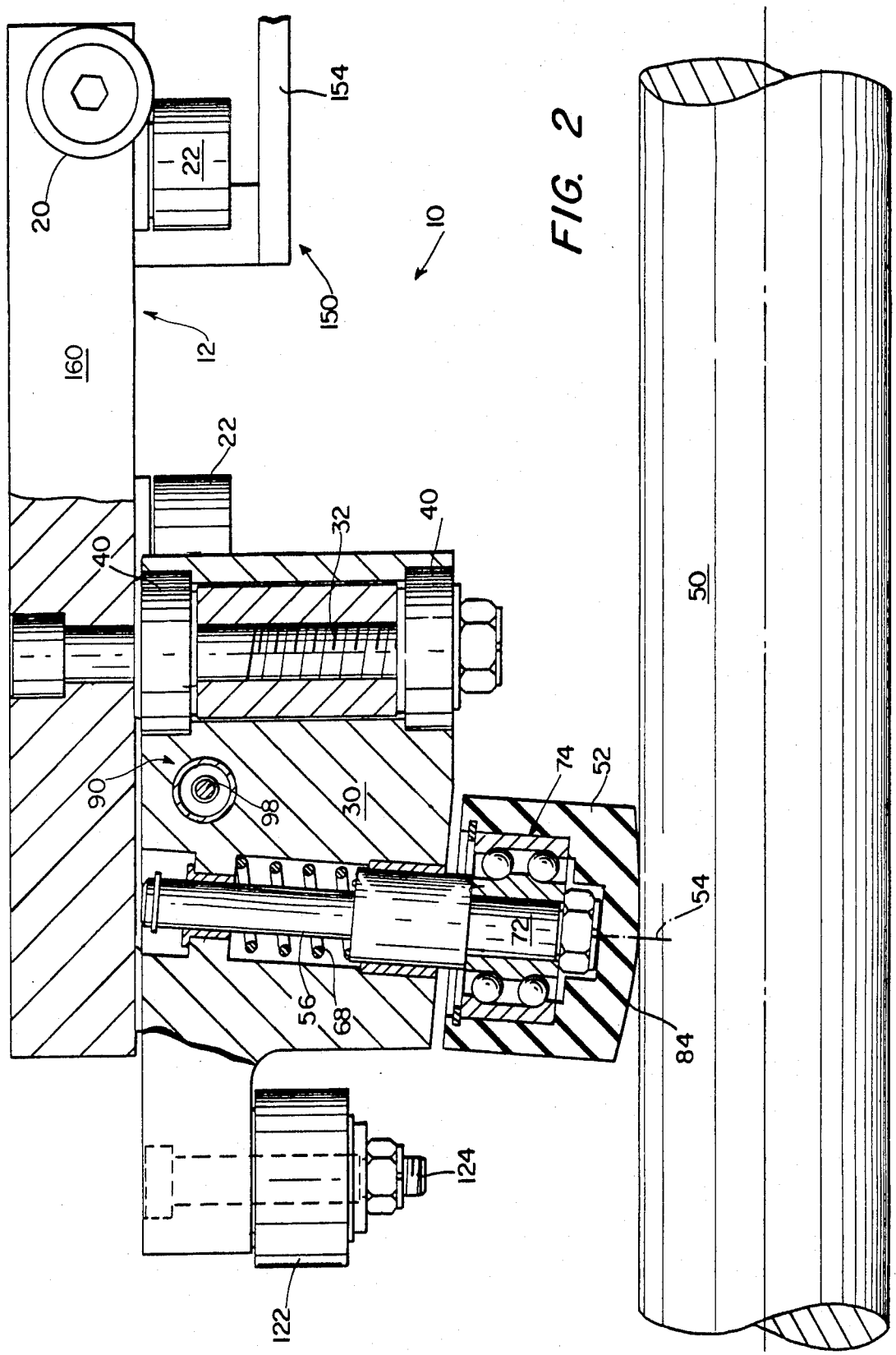
FIG. 2 is a front elevation view in partial cross section of the conveying system depicted in FIG. 1 with the tracks removed for clarity.
Figure 3:
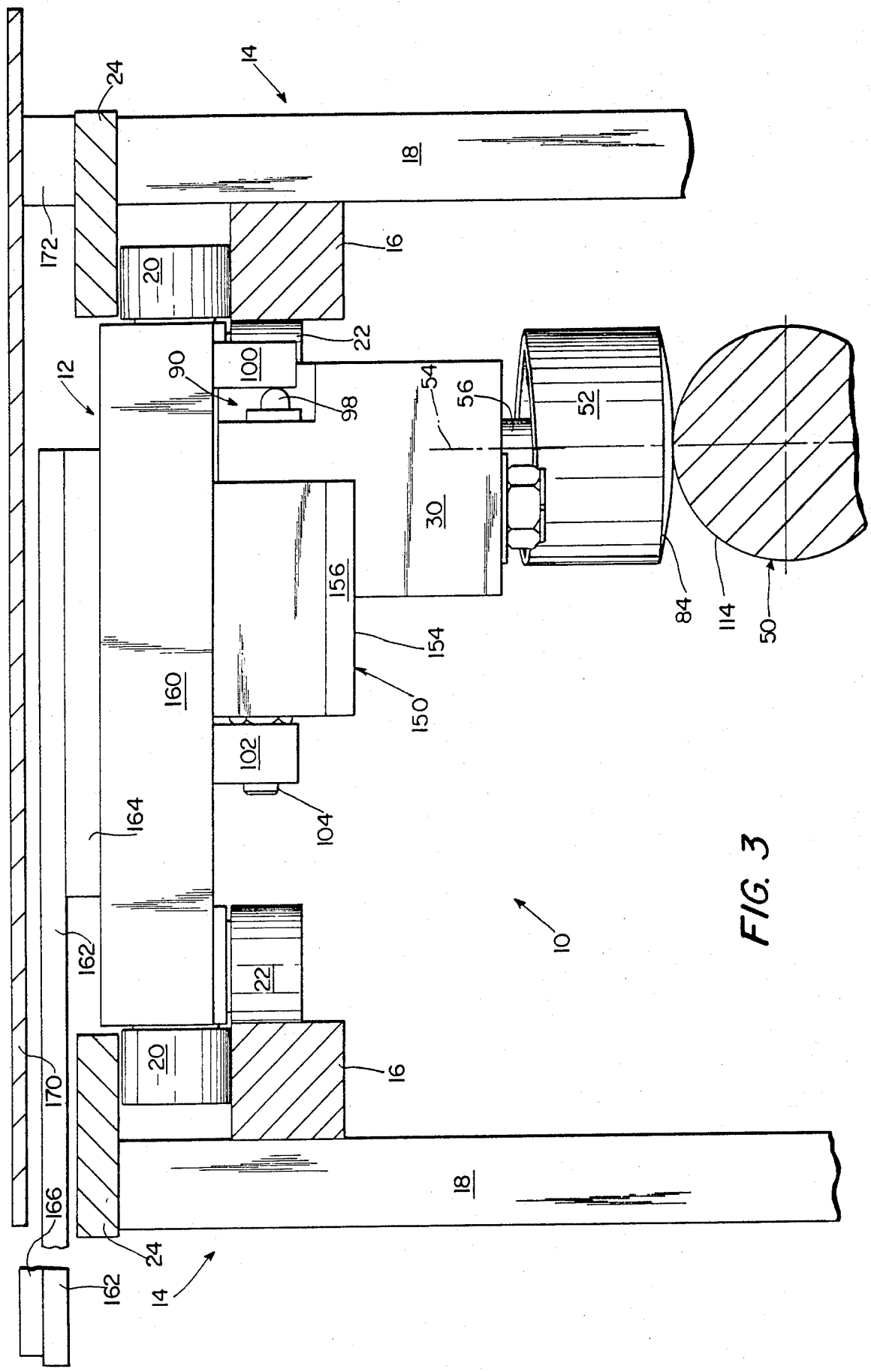
FIG. 3 is a side elevation view of the conveying system depicted in FIG. 1.

With reference now to the drawings in which like numerals represent like elements throughout the several views, a conveying system 10 which is used with the transfer mechanism of the present invention is depicted in FIGS. 1, 2, and 3. Conveying system 10 is the subject of a separate application filed by the assignees of the present invention entitled "Conveying System" and filed concurrently herewith. This prior application (Ser. No. 408,817) is hereby incorporated by reference, and is described subsequently for additional clarity.

Conveying system 10 includes a pallet 12 which is mounted for movement on a trackway 14. Trackway 14 includes a pair of elongate tracks 16 which are parallel to one another and which are supported by a plurality of supports 18 (two of which are shown). Pallet 12 is provided with at least three vertical support wheels 20 (although four wheels 20 are preferred) which ride along the upper surfaces of tracks 16 and with three lateral support wheels 22 which ride along the inner lateral surfaces of tracks 16. It should be noted that one lateral wheel contacts the inner lateral surface of one track 16 while two lateral wheels contact the inner surface of the other track 16. With this construction, pallet 12 is mounted for a relatively friction free longitudinal movement along tracks 16. It should be noted that trackway 14 is provided with retaining flanges 24 to maintain vertical support wheels 20 in position to engage tracks 16.

Located beneath pallet 12 is a base 30. As shown best in FIG. 2, base 30 is pivotally attached to pallet 12 for rotation in a horizontal plane by a shaft 32 which extends at a right angle with respect to the longitudinal plane of pallet 12. By use of suitable bearing members 40, base 30 is firmly attached to pallet 12 while being freely pivotal in a horizontal plane relative to pallet 12.

Located below pallet 12 and directly underneath base 30, and extending parallel to tracks 16, is a cylindrical drive shaft 50. Drive shaft 50 is rotatable about the longitudinal axis thereof by a suitable means (not shown). Located between base 30 and drive shaft 50 is a drive roller 52. Drive roller 52 is rotatably mounted relative to base 30 about an axis 54 disposed at an acute angle with respect to the longitudinal axis of rotation of drive shaft 50 on an axle 56. As shown best in FIG. 2, axle 56 is slidably mounted in a bore 58 along axis 54. A spring 68 urges axle 56 towards drive shaft 50.

Drive roller 52 is rotatably mounted on distal end 72 of axle 56 by a bearing means 74. Drive roller 52 includes an axial face 84 which contacts drive shaft 50. Axial face 84 is depicted in FIG. 2 as having a convexly curved surface when viewed in cross section. A suitable curvature for axial face 84 is elliptical, although axial face 84 could also be provided with a conical shape, or even a flat surface.

As shown best in FIG. 2, axis 54 about which drive roller 52 rotates is not perpendicular to longitudinal axis of rotation of drive shaft 50 so that axial face 84 contacts drive shaft 50 at a point offset from the center of drive roller 52. The offset angle of axis 54 is between 2 to 20 degrees, and preferably is between 5 to 15 degrees with respect to a vertical axis. By offsetting axis 54 somewhat, axial face 84 contacts drive shaft 50 with what is to be considered a substantially tangential point contact.

Contained in base 30 is resilient biasing means 90, as shown in FIG. 1, which resiliently pivots base 30 about shaft 32 to the forward drive position where drive roller 52 contacts inner quadrant 114, as shown in FIG. 3, of drive shaft 50. Biasing means 90 includes a spring 94 which presses against a stop 96 and a movable rod 98. Mounted on the underside of pallet 12 adjacent the outer end of rod 98 is a stop block 100. As base 30 is pivotable relative to pallet 12, the end of rod 98 presses against stop block 100 so that spring 94 causes base 30 to pivot away from stop block 100 to the drive position. It should be noted that base 30 is depicted in FIGS. 1 to 4 in a neutral position.

In order to prevent base 30 from pivoting beyond the drive position, a drive stop block 102 is mounted to the underside of pallet 12 on the opposite side of base 30 from stop block 100. Threadably mounted in drive stop block 102 is a set screw 104. As base 30 pivots inwardly to the drive position due to the force of spring 94, edge 108 of base 30 contacts the end of set screw 104 so that further pivoting of base 30 is prevented. The precise location of the end of set screw 104 is adjusted by moving set screw 104 appropriately and locking it in position so that base 30 pivots to a specified position where drive roller 52 contacts a drive shaft 50 at the inner edge thereof. The specific location of the point of contact determines the speed with which pallet 12 is driven as will be explained subsequently.

In operation, pallet 12 is driven along trackway 14 in the following manner. With reference to FIG. 3, drive roller 52 and base 30 are shown in the neutral position where pallet 12 is not driven along trackway 14. In this neutral position, drive roller 52 is centered over drive shaft 50 so that axial face 84 of drive roller 52 contacts drive shaft 50 at the topmost point. It should be noted that although the axis 54 of rotation of drive roller 52 is offset slightly along the longitudinal length of drive shaft 50, drive roller 52 does not drive pallet 12 in either direction as drive roller 52 spins freely about axis 54.

As shown in FIGS. 1, 2, and 3, base 30 is free to pivot about shaft 32 due to the urging of resilient biasing means 90. Thus, with drive shaft 50 constantly rotating, base 30 and drive roller 52 are urged over the inner quadrant 114 (see FIG. 3) of drive shaft 50. This causes the point of contact between axial face 84 and drive shaft 50 to shift radially from the center of axial face 84. When this occurs, drive roller 52 continues to freely rotate about axis 54, but a longitudinal driving force is now also exerted by drive shaft 50 on drive roller 52. This drive force then causes pallet 12 to move along trackway 14. It should be noted that the direction of travel of pallet 12 depends upon the direction of rotation of drive shaft 50. Rotation of drive shaft 50 in one direction causes pallet 12 to move in one direction along trackway 14 whereas the opposite rotation of drive shaft 50 causes pallet 12 to move in an opposite direction along trackway 14.

As drive roller 52 is urged into contact with inner quadrant 114 of drive shaft 50 by biasing means 90, it should be noted that the rotation of drive shaft 50 also urges drive roller 52 and base 30 in the same direction. Therefore, base 30 and drive roller 52 continue to move away from the top of drive shaft 50 until edge 108 of base 30 contacts the end of set screw 104. The end of set screw 104 is conveniently locked in place at a location whereby pallet 12 is moved along trackway 14 at a desired velocity, or at a maximum velocity. It should be noted that axial face 84 of drive roller 52 is resiliently urged in contact with drive shaft 50 so that axial face 84 remains in contact with drive shaft 50 even though inner quadrant 114 of drive shaft 50 is spaced somewhat further away from base 30 than the top of drive shaft 50. With base 30 in the forward drive position where axial face 84 is in contact with inner quadrant 114 of drive shaft 50, pallet 12 moves freely along trackway 14 on wheels 20 and 22. In addition, pallet 12 is precisely and positively maintained on trackway 14.

Figure 4:
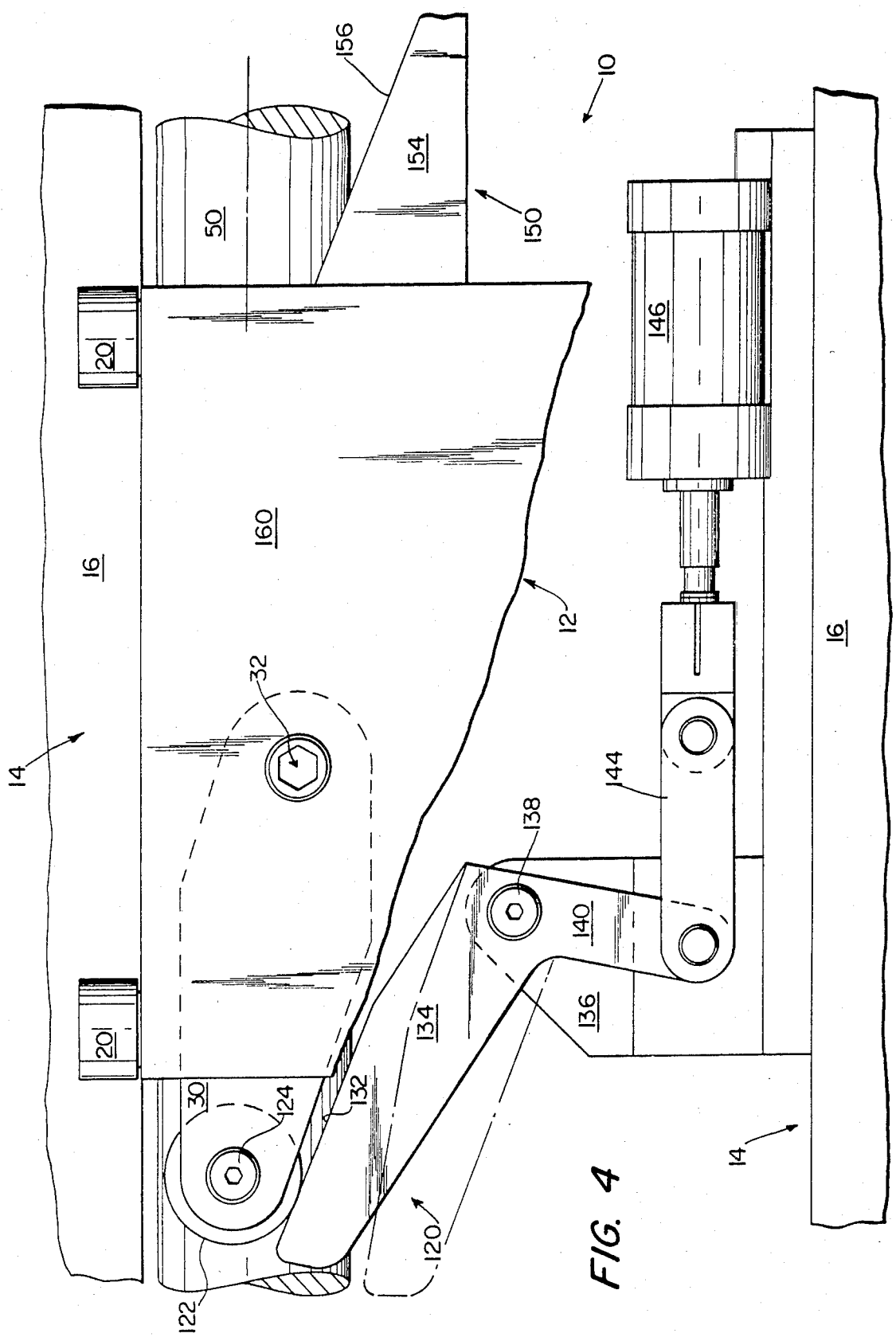
FIG. 4 is a partially broken away top view of the conveying system depicted in FIG. 1 showing a cam stopping mechanism according to the present invention.

In many industrial applications, it is desirous to have pallet 12 of conveying system 10 capable of being stopped at one or more work stations situated along the length of trackway 14 where a variety of operations can be performed on the object carried by pallet 12. Conveying system 10 of the present invention includes a positioning means 120 depicted in FIG. 4 to perform this function. With reference therefor to FIG. 4 in addition to FIGS. 1, 2, and 3, positioning means 120 includes a cam roller 122 which is rotatably mounted to base 30 by an axle 124.

Pallet 12 in FIG. 4 is designed for forward movement from right to left. Cam roller 122 extends below base 30 and is positioned to contact a cam surface 132. Cam surface 132 is disposed at an angle to the vertical axis of drive shaft 50 and is part of an arm 134. Arm 134 is pivotally mounted to a support 136 by a shaft 138. Support 136 is securely attached to trackway 14. Integrally formed to arm 134 at an angle thereto is a lever arm 140. The distal end of lever arm 140 is attached by a coupling member 144 to a fluid actuator 146. Fluid actuator 146 is a double acting pneumatic or hydraulic actuator. Fluid actuator 146 moves cam surface 132 of arm 134 from the position depicted in FIG. 4 where cam roller 122 contacts cam surface 132 to a position where cam roller 122 does not contact cam surface 132 (shown in phantom).

In operation, positioning means 120 functions in the following manner. As pallet 12 moves from right to left with base 30 in the drive position and drive roller 52 contacting rotating drive shaft 50, arm 134 is maintained by fluid actuator 146 in the position shown in FIG. 4. Arm 134 is positioned along trackway 14 at a location where it is desired to stop pallet 12. As pallet 12 moves along track means 14, cam roller 122 engages cam surface 132. At the initial point of engagement, base 30 is in the forward drive position with drive roller 52 located so that axial face 84 is contacting inner quadrant 114 of drive shaft 50. As cam roller 122 continues to move along cam surface 132 which is located at an angle with respect to drive shaft 50, cam surface 132 causes base 30 to rotate about shaft 32. This causes axial face 84 of drive roller 52 to correspondingly move along inner quadrant 114 of drive shaft 50 towards the uppermost point of drive shaft 50. Pallet 12 continues forward movement so long as axial face 84 is in contact with inner quadrant 114, although the velocity of forward movement continually decreases as the point of contact between axial face 84 and drive shaft 50 approaches the uppermost point on drive shaft 50. Thus, as pallet 12 moves forward and cam roller 122 continues along cam surface 132, the velocity of pallet 12 quickly decreases and finally stops as the point of contact of axial face 84 with drive shaft 50 reaches the uppermost, neutral or no drive position, on drive shaft 50.

After pallet 12 has been stopped at the location desired, a separate precise positioning means (not shown) can lock pallet 12 in a precise position so that an operation can be performed on the object carried by pallet 12. Once the operation has been performed on the object carried by pallet 12, fluid actuator 146 is actuated to pivot arm 134 so that cam roller 122 is no longer in contact with cam surface 132. As soon as arm 134 is moved, resilient biasing means 90 again causes base 30 to pivot to the forward drive position and pallet 12 quickly accelerates away from positioning means 120. After pallet 12 has gone by, fluid actuator 146 is again operated to move arm 134 back to the position so that cam roller 122 of the succeeding pallet 12 traveling along trackway 14 is stopped at positioning means 120 if so desired.

Where a plurality of pallets 12 are conveyed along trackway 14, a stop tail 150 is attached to the rear portion of pallet 12 as shown in the figures. Stop tail 150 includes a tail portion 154. Tail portion 154 extends horizontally behind pallet 12 and has a cam surface 156. Cam surface 156 is vertically and laterally located to make contact with cam roller 122 of a succeeding pallet 12.

In operation, stop tail 150 functions in the following manner. If it is desired to stack a number of pallets 12 along trackway 14 while other pallets 12 are advancing and or stopping at work stations, or if one pallet 12 is inadvertently prevented from advancing along trackway 14, stop tails 150 of each pallet 12 in cooperation with cam rollers 122 of each succeeding pallet 12 prevent pallets 12 from colliding with one another and from damaging conveying system 10. Where one pallet 12 is stationary with respect to trackway 14 for whatever reason, and another pallet 12 is driven by drive shaft 50 towards the first pallet 12, the first contact between the two pallets is cam roller 122 of the second pallet engaging cam surface 156 of stop tail 150 of the first pallet. The function of cam surface 156 of stop tail 150 is essentially the same as cam surface 132 of positioning means 120. That is, as the second pallet continues to be driven by a drive shaft 50 and a drive roller 52 towards the first pallet after cam roller 122 of the second pallet contacts cam surface 156 of the first pallet, cam roller 122 follows the angle of cam surface 156 and causes base 30 of the second pallet to pivot from the forward drive position to the neutral position. Thus, second pallet 12 is quickly deaccelerated by the action of cam roller 122 of the second pallet on cam surface 156 of the first pallet and a collision is avoided. In a similar manner, a succeeding pallet is similarly stopped and maintained by the adjacent forward pallet. As soon as the first pallet is released and moved forward, cam roller 122 of the succeeding pallet is released and base 30 moves to the forward drive position and that pallet advances as well. In the same manner, each succeeding pallet successively advances as well.

In the preferred embodiment of the invention as depicted in FIG. 3, where conveying system 10 is used to convey an object between a plurality of work stations, pallet 12 includes a platform 160 to which a stage 162 is attached by a spacer 164. Stage 162 extends slightly above and laterally beyond one trackway 14 as shown. Near the distal end of stage 162 is a suitable object mounting means 166. With this construction, the object is located on one side of conveying system 10 and is easily accessible at any work station from any desired direction (top, sides, and bottom) without interference from conveying system 10. This also allows each work station to be easily constructed at an appropriate location on one side of conveying system 10. It should be appreciated that where the object located on mounting means 166 is sufficiently heavy, vertical support wheel 20 adjacent to the object contacts track 16 while vertical support wheel 20 and lateral support wheel 22 located away from the object are urged upwards into contact with retaining flange 24 and laterally into contact with track 16, respectively.

It should be noted that a cover 170 is used to protect the entire length of conveying system 10. As shown in FIG. 3, cover 170 is mounted to retaining flange 24 on the opposite side from mounting means 166 by a series of spacers 172 (one of which is shown). Stage 162 projects underneath and beyond cover 170. With cover 170, any oil or debris created by the work stations or otherwise is kept away from conveying system 10. In particular, oil is kept off of drive shaft 50 which could interfere with the propulsion of pallet 12 by drive roller 52.

Depicted in FIGS. 5 and 6 is a transfer mechanism 200 for a conveyor system 202. Conveyor system 202 includes trackways 204 and 206 which are substantially parallel to one another and which are substantially identical to trackway 14 described above. With trackways 204 and 206 oriented as shown, each trackway 204 and 206 includes an inside track 208a and 208b, respectively, and an outside track 210a and 210b, respectively.

As shown best in FIG. 6, outside track 210a includes a vertical support surface 212a and a lateral support surface 214a. Outside track 210a is supported by a suitable support 216a. Located above vertical support surface 212a is a retaining flange 218a. Disposed below outside track 210a is a cylindrical drive shaft 220a which is suitably supported and driven for rotation as suggested. Outside track 210b is similarly constructed and the same numbers followed by the letter "b" have been used to identify similar elements.

Inside track 208a is substantially a mirror image of outside track 210a and includes a vertical support surface 222a and a lateral support surface 224a. In addition, inside track 208a also has a support 226a and a retaining flange 228a. Inside track 208b is similarly constructed and like elements have been identified with the same number followed by a "b".

Transfer mechanism 200 includes an arcuate outside track 230 and a four sided turntable 232. In this embodiment, arcuate track 230 is semicircular shaped and includes a vertical support surface 234 and a lateral support surface 236. At each end, vertical support surface 234 and lateral support surface 236 of arcuate track 230 are coplanar with respective vertical support surfaces 212a and 212b and lateral support surfaces 214a and 214b of outside tracks 210a and 210b. Conveniently, outside tracks 210a and 210b and arcuate track 230 are integrally formed. Arcuate track 230 is suitably supported by an end support 238 and portions of supports 216a and 216b.

Turntable 232 includes four inside track portions 240a, 240b, 240c, and 240d. Each inside track portion 240 is located about the periphery of turntable 232 and are identical to each other. Therefore, inside track portion 240a is exemplary and will be described in detail with the like elements of the other track portions 240 identified by the same numerals with the appropriate letter "b", "c", or "d" after the numeral.

As shown best in FIG. 6, inside track portion 240a includes a vertical support surface 242a and a lateral support surface 244a. In a manner similar to inside tracks 208a and 208b, inside track portion 240a also includes a retaining flange 248a which is supported by a suitable support 246a. Spaced laterally inward from lateral support surface 244a is a curb 250a which is mounted to turntable 232 by a suitable support 252a. Curb 250a is spaced from lateral support surface 240a by a distance slightly larger than the diameter of the lateral support wheel of the pallet. It should be noted that both ends of curb 250a include a beveled edge 254a.

Turntable 232 is mounted to and rotated by a suitable motor 256. Turntable 232 is sized and located such that an inside track portion, such as track portion 240a, is locatable adjacent end 258a of inside track 208a with vertical support surface 242a and lateral support surface 244a coplanar with vertical support surface 222a and lateral support surface 224a, respectively. At the same time, inside track portion 240c is located coplanar with inside track 208b. By providing motor 256 with a suitable cam mechanism or geneva gear, each inside track portion 240 can be sequentially presented opposite end 258a and subsequently presented opposite end 258b. In addition, the dwell time during which an inside track portion 240 is located opposite an end 258 can be adjusted as desired.

Figure 9:
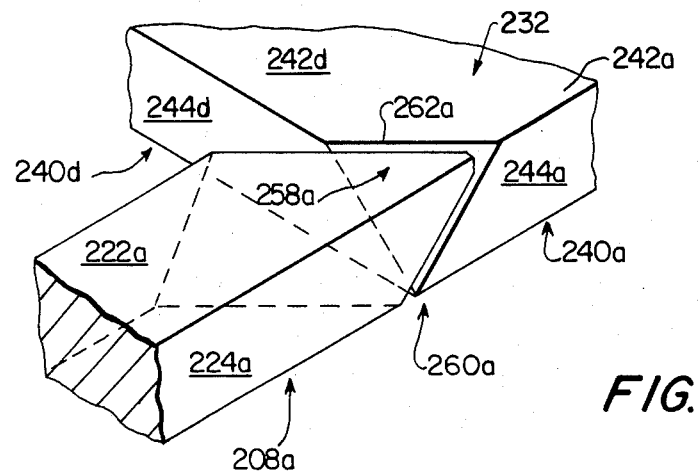
FIG. 9 is a perspective view of a corner of the turntable adjacent the end of an inside track.

In order to provide a smooth transition of the pallet wheels from inside track 208a to an inside track portion 240a, end 258a of inside track 208a and corner 260a of turntable 232 are constructed as shown additionally in FIG. 9. As shown, corner 260a is beveled from vertical support surfaces 242a and 242d down to the bottom corner where lateral support surfaces 242a and 242d intersect. End 258a is angled parallel to beveled edge 262a, and is similarly beveled away from turntable 232. With this construction, the gaps between end 258a and corner 260a are not vertical or lateral, but rather at an angle. Therefore, as the wheels of the pallet travel along vertical support surface 222a and lateral support surface 224a, at the transfer point the wheels of the pallet are supported both by vertical support surface 222a and vertical support surface 242a, and lateral support surface 224a and lateral support surface 244a. In this manner, a smooth transfer is accomplished.

With this construction, turntable 232 is free to turn without corner 260a contacting end 258a. In order to provide clearance between retaining flange 248a and retaining flange 228a, retaining flange 248a and retaining flange 228a are cut at an angle parallel to beveled edge 262a with a slight gap therebetween. This gap provides the necessary clearance between retaining flanges 228a and 248a as turntable 232 rotates. It should be noted that corners 260b, 260c and 260d are similarly constructed to corner 260a, and that end 258b is similarly constructed to end 258a.

In operation, transfer mechanism 200 functions in the following manner. As a pallet, such as pallet 12 described above, travels from left to right along trackway 204, pallet 12 is vertically supported by vertical support wheels 20 and laterally located by lateral support wheels 22. In this preferred embodiment, where three lateral support wheels 22 are provided on pallet 12, two lateral support wheels 22 engage lateral support surface 224a of inside track 208a and one lateral support wheel 22 engages lateral support surface 214a of outside track 210a. Pallet 12 is driven along trackway 204 by cylindrical drive shaft 220a. As pallet 12 is driven along trackway 204, turntable 232 is positioned such that an inside track portion 240, such as inside track portion 240a, is positioned coplanar with inside track 208a as shown in FIG. 5. Thus, vertical support wheels 20 and lateral support wheels 22 easily travel along vertical support surface 222a and lateral support surface 224a and off of end 258a onto vertical support surface 242a and lateral support surface 244a of turntable 232. Finally, pallet 12 is stopped at a position where both lateral support wheels 22 are located between lateral support surface 244a and curb 250a. Pallet 12 is stopped at this position by a suitable stop mechanism such as positioning means 120 described above. It should be noted that curb 250a is provided with beveled edge 254a so that lateral support wheels 22 easily enter the space between curb 250a and lateral support surface 244a.

After pallet 12 is located so that the two lateral wheels 22 are located between curb 250a and lateral support surface 244a, turntable 232 is rotated 90° by motor 256. As turntable 232 rotates, vertical support wheels 20 of pallet 12 which formerly were in contact with vertical support surface 212a move onto vertical support surface 234 of arcuate outside track 230. In addition, single lateral support wheel 22 formerly in contact with lateral support surface 214a similarly moves onto lateral support surface 236 of arcuate outside track 230. It should be noted that pallet 12 is caused to move by turntable 232 due to the fact that the two lateral support wheels 22 are trapped along a substantially straight lateral support surface 244a while the other lateral support wheel 22 moves along a curved lateral support surface 236.

After turntable 232 is rotated 90°, inside track portion 240d is then presented opposite end 258a of inside track 208a so that a new pallet 12 traveling along trackway 204 can be appropriately located on inside track portion 240d. After a new pallet 12 has been located on inside track portion 240d, turntable 232 is again rotated 90° so that inside track portion 240c is presented opposite end 258a and inside track portion 240a is now presented opposite end 258b of inside track 208b.

As inside track portion 240a swings around to end 258b, a suitable start mechanism such as positioning means 120 described above is located near end 258b to maintain drive roller 52 in the neutral position until rotation of turntable 232 has stopped. After turntable 232 has stopped, positioning means 120 is moved to allow drive roller 52 to automatically move to the forward drive position. As this occurs, pallet 12 is driven along inside track portion 240a and arcuate outside track 230 onto trackway 206 in a similar manner to the manner in which pallet 12 was driven from trackway 204 onto inside track portion 248. Thus, pallet 12 has been efficiently and easily transferred from trackway 204 by transfer mechanism 200 to trackway 206. As additional pallets 12 travel along trackway 204, these additional pallets can subsequently be similarly transferred.

As it is frequently desired to perform various operations on an object carried by pallet 12, it should be noted that work stations can be conveniently located around turntable 232. For example, with turntable 232 in a position depicted in FIG. 5, work stations to perform operations on the object on a pallet 12 can be provided at the locations of inside track portions 240a, 240b, and 240c. Thus, after pallet 12 is initially positioned on inside track portion 240a, a suitable operation can be performed on the object carried. Next, after turntable 232 has rotated 90°, an additional operation can be performed on the object. Finally, after turntable 232 is again rotated 90°, a further operation can be performed on the object prior to releasing pallet 12 to continue along trackway 206. In this manner, three work stations and stops are conveniently provided by use of turntable 232.

In order to prevent rotation of turntable 232 by motor 256 except for when pallet 12 is properly positioned on the inside track portion 240, a suitable control means (not shown) is provided. Such a control means would sense the proper positioning of pallet 12 and otherwise prevent actuation of motor 256 until pallet 12 is properly positioned. In addition, where a plurality of pallets 12 are traveling on trackway 204, an escapement means (not shown) can be provided to allow only one pallet 12 at a time to advance toward turntable 232 when an inside track portion 240 is properly located to receive pallet 12. This escapement means could take the form of positioning means 120 described above to hold one pallet 12, with stop tails 150 on each pallet allowing for the stacking of the plurality of pallets at the escapement means. Positioning means 120 could then be operated to allow a single pallet 12 to advance.

Figure 7:
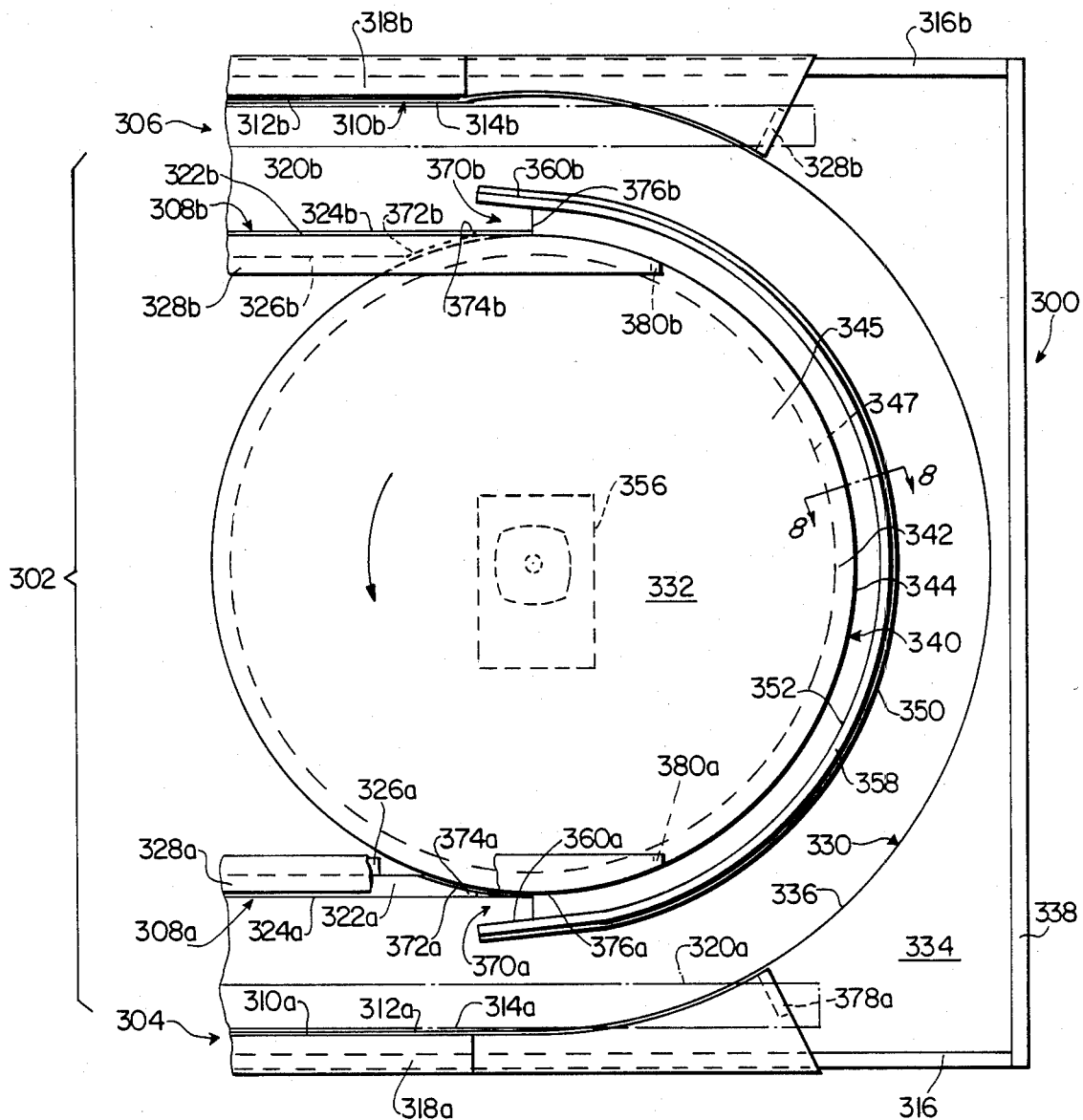
FIG. 7 is a top plan view of an alternate embodiment of a transfer mechanism according to the present invention.
Figure 8:
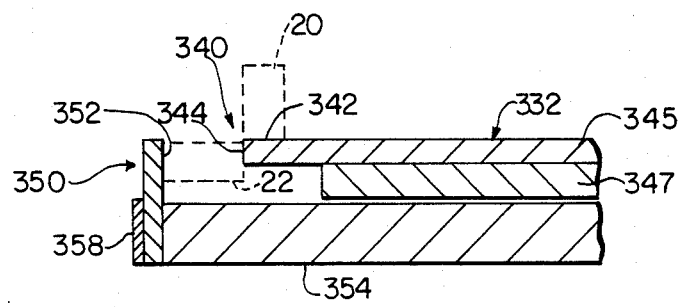
FIG. 8 is a cross-sectional plan view of a portion of the turntable taken along the line 8—8 in FIG. 7.

Depicted in FIGS. 7 and 8 is an alternative embodiment of the present invention including a transfer mechanism 300 and conveying system 302. Conveying system 302 includes trackways 304 and 306 having inside tracks 308a, 308b, and outside tracks 310a, 310b, respectively. Outside tracks 310a and 310b have vertical support surfaces 312a, 312b, lateral support surfaces 314a, 314b, supports 316a, 316b, and retaining flanges 318a, 318b, respectively. In addition, cylindrical drive shafts 320a, and 320b, are, respectively, disposed below outside tracks 310a, 310b. Inside tracks 308a, 308b include vertical support surfaces 322a 322b, lateral support surfaces 324a, 324b, supports 326a, 326b, and retaining flanges 328a, 328b, respectively.

Connecting outside track 310a with outside track 310b is an arcuate outside track 330 of semicircular shape. Arcuate outside track 330 extends around a turntable 332 and includes a vertical support surface 334 and a lateral support surface 336. End support 338, together with supports 316a and 316b support arcuate outside track 330.

With reference now to FIGS. 7 and 8, it can be seen that turntable 332 includes a track portion 340 located around the periphery thereof. Track portion 340 includes a vertical support surface 342 and lateral support surface 344. Track portion 340 is formed along the peripheral edge of a circular disc 345 which is attached to a somewhat smaller circular base 347. Turntable 332 is rotated continuously by a motor 356.

Extending around a portion of turntable 332 is an arcuate curb 350. The inside surface 352 of curb 350 is spaced from lateral support surface 344 of track portion 340 by a distance equal to the outside diameter of the lateral support wheel of the pallet. Curb 350 is mounted adjacent track portion 340 by a suitable support 354. Curb 350 is mounted to support 354 by a mounting flange 358. As shown best in FIG. 7, curb 350 is approximately semicircular shaped and extends parallel to arcuate outside track 330 except for ends 360a and 360b. Ends 360a and 360b extend curb 350 slightly beyond a half circle. It should be noted that ends 360a and 360b are relatively straight and thus are spaced a somewhat greater distance from track portion 340 than the rest of curb 350.

Figure 10:
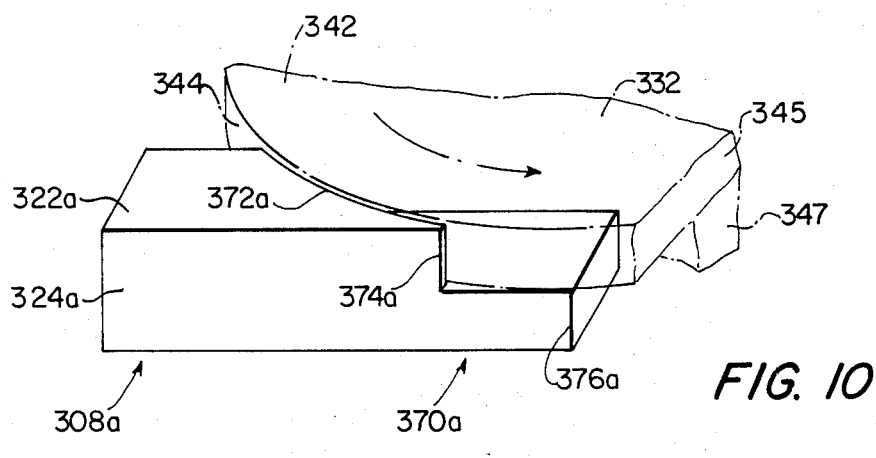
FIG. 10 is a perspective view of the transfer end of an inside track.

In order to provide a smooth transfer of the wheels of the pallet from inside track 308a to track portion 340, and a subsequent transfer from track portion 340 to inside track 308b, ends 370a and 370b are provided, respectively, on inside tracks 308a and 308b. As ends 370a and 370b are substantially identical, only end 370a will be described in detail, especially with reference to FIGS. 7 and 10.

Vertical support surface 322a terminates at end 370a in an arcuate portion 372a. Arcuate portion 372a is spaced slightly from track portion 340 to allow for the rotation of track portion 340. Lateral support surface 324a terminates at an upper tail 374a located at the end of arcuate portion 372a and immediately adjacent, but spaced from, lateral support surface 344 of track portion 340. Lateral support surface 324a also terminates at a lower tail 376a which extends below upper tail 374a to the point where lower tail 376a is substantially tangent to, though slightly below, lateral support surface 344 of track portion 340. It should be appreciated that upper tail 374a and lower tail 376a are both rigidly supported by the remainder of inside track 308a which extends below circular disc 345.

With this construction of end 370a, a smooth transition is provided for the wheels of the pallet from inside track 308a to track portion 340. As vertical support wheel 20 of pallet 12 travels from left to right along vertical support surface 322a, vertical support wheel 20 is initially supported solely by vertical support surface 322a until arcuate portion 372a is reached. At arcuate position 372a, vertical support wheel 20 passes partially beyond arcuate portion 372a and is supported by both vertical support surface 322a and vertical support surface 342 of track portion 340. Finally, vertical support wheel 20 passes upper tail 374a and is supported solely by vertical support surface 342.

As lateral support wheel 22 of pallet 12 travels from left to right in contact with lateral support surface 324a, lateral support wheel 22 passes upper tail 374a and is thereafter solely in contact with lower tail 376a. At this time, the upper portion of lateral support wheel 22 is spaced slightly from lateral support surface 344 of track portion 340. As lateral support wheel 22 continues along lower tail 376a, the upper portion of lateral support wheel 22 reaches the point where lower tail 376a is tangent to lateral support surface 344. At this point, lateral support wheel 22 is supported both by lower tail 376a and lateral support surface 344. Finally, lateral support wheel 22 passes beyond lower tail 376a and is supported solely by lateral support surface 344. It should be noted that as lateral support wheel 22 leaves upper tail 374a, lateral support wheel 22 is also guided along inside surface 352 of arcuate curb 350.

End 370b is substantially similar to end 370a and the same elements have been identified with the same number followed by a "b". End 370b provides a smooth transfer of vertical support wheels 20 and lateral support wheels 22 from track portion 340 onto inside track 308b in the same manner as the transfer from inside track 308a to track portion 340, but in the reverse order.

As shown in FIG. 7, retaining flanges 318a and 318b extend beyond the ends of respective outside tracks 310a and 310b and over a portion of arcuate outside track 330. These extended portions of retaining flanges 318a and 318b are curved to follow arcuate outside track 330 and include an upwardly beveled end 378a and 378b, respectively, to afford an easy exit and entrance for vertical support wheels 20 of pallet 12. Similarly, retaining flanges 328a and 328b of respective inside tracks 308a and 308b also extend beyond respective ends 370a and 370b. Retaining flanges 328a and 328b are also curved so as to be coplanar with lateral support surface 344 of track portion 340. The ends of retaining flanges 328a and 328b also include upwardly beveled ends 380a and 380b, respectively, to afford easy exit and entrance, respectively, underneath.

In operation, transfer mechanism 300 functions in the following manner to transfer a pallet 12 traveling along trackway 304 to trackway 306. Preferably, turntable 332 is rotating continuously so that the transfer takes place as soon as pallet 12 reaches transfer mechanism 300. Alternatively, rotation of turntable 332 can be commenced as soon as a pallet 12 is sensed approaching turntable 332 by an appropriate sensing means. Thus, turntable 332 is rotating as vertical support wheels 20 and lateral support wheels 22 of pallet 12 traveling along inside track portion 308a are transferred as described above to track portion 340. As lateral support wheels 22 are transferred, lateral support wheels 22 are trapped between inside surface 352 of curve 350 and lateral support surface 344 of track portion 340. As lateral support surface 344 is rotating, lateral support wheels 22 are in turn rotated and caused to travel along inside surface 352. This serves to propel pallet 12. At approximately the same time that wheels 20 and 22 are transferred from inside track 308a to track portion 340, vertical support wheels 20 and lateral support wheels 22 traveling along outside track 310a begin to ride upon vertical support surface 334 and lateral support surface 336, respectively, of arcuate outside track 330. Preferably, arcuate outside track 330 is integrally formed with outside track 310a so that the transfer is completely smooth. It should be noted that the inside edge of retaining flange 318a is bowed outward slightly to provide clearance for the edge of pallet 12 as pallet 12 changes from a linear to a rotational movement.

As lateral support wheels 22 are transferred to lateral support surface 344 of track portion 340 and are thus being driven by turntable 332, drive roller 52 is still in contact with cylindrical drive shaft 320a so that pallet 12 is driven by both devices. As pallet 12 continues around turntable 332, axial face 84 of drive roller 52 eventually follows the path of arcuate outside track 330 and separates from cylindrical drive shaft 328. Therefore, at this time, pallet 12 is solely driven by the rotation of lateral support surface 344 in contact with lateral support wheels 22. After drive roller 52 separates from cylindrical drive shaft 328, vertical support wheels 20 pass beneath beveled ends 378a and 380a of retaining flanges 318a and 328a, respectively.

Continued rotation of turntable 332 eventually brings pallet 12 to the position where vertical support wheels 20 pass underneath of beveled ends 378b and 380b of retaining flanges 318b and 328b, respectively. Shortly thereafter, drive roller 52 contacts cylindrical drive shaft 320b. In this manner, pallet 12 is driven both by cylindrical drive shaft 320b and turntable 332 and is caused to pass from track portion 340 and arcuate outside track 330 onto inside track 308b and outside track 310b, respectively. The transfer occurs in the same manner as described above for the transfer from trackway 304 to transfer mechanism 300, but in the reverse order. Finally, pallet 12 is driven by a cylindrical drive shaft 320b from right to left along trackway 306.

Figure 11:
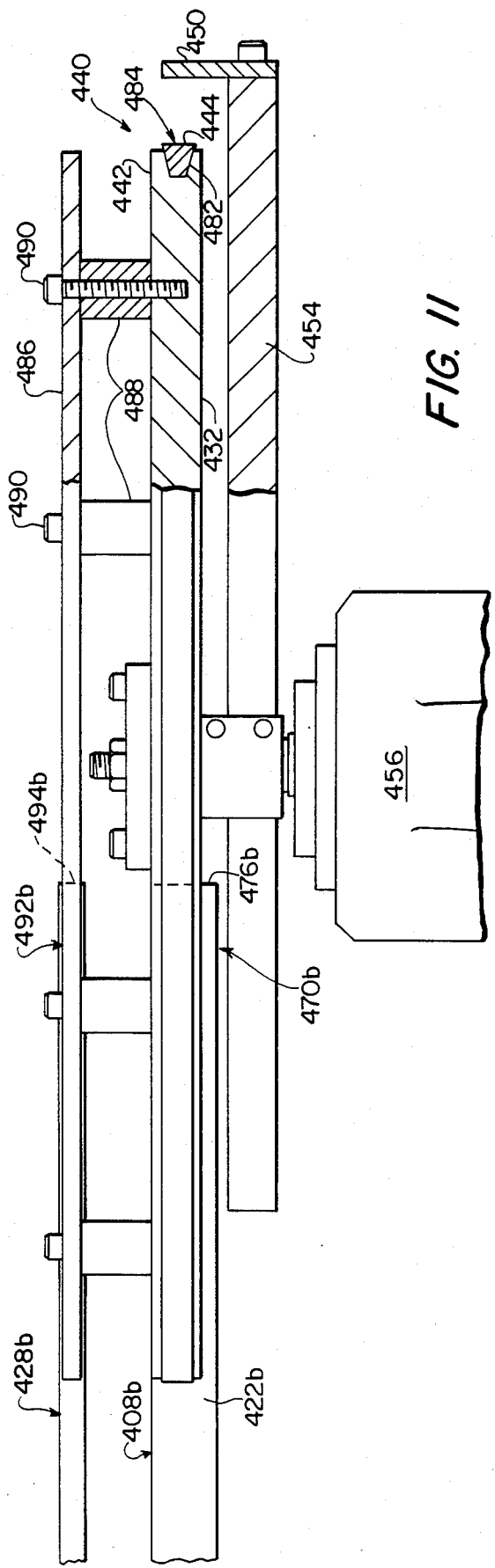
FIG. 11 is a partially broken away side elevation view of still another alternate embodiment of a turntable.
Figure 12:
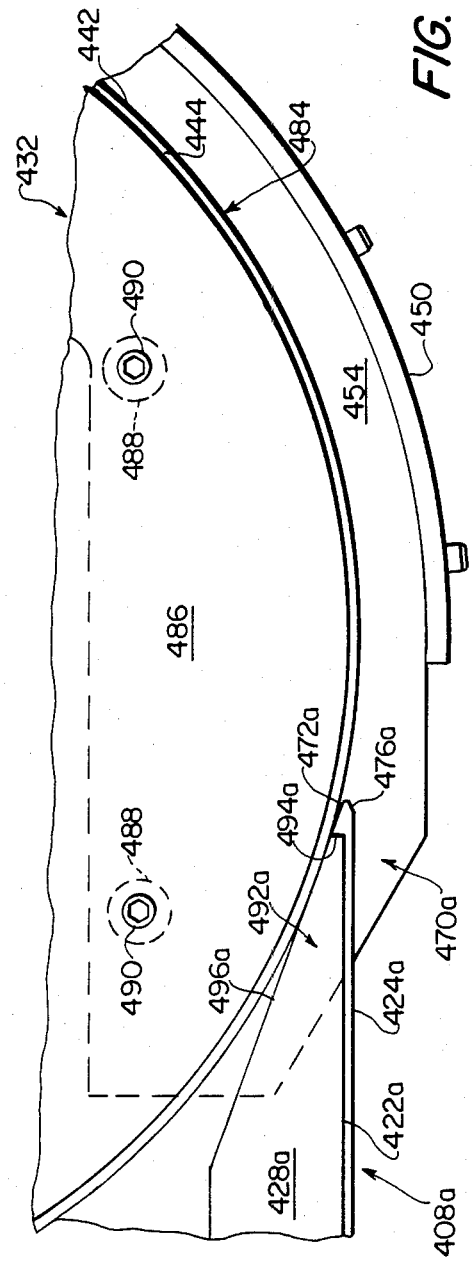
FIG. 12 is a partial top view of the turntable depicted in FIG. 11.

Depicted in FIGS. 11 and 12 is an alternative embodiment of a turntable 432 which is used in much the same manner as turntable 332 discussed above. In this embodiment, turntable 432 is rotated by a motor 456 and an arcuate curb 450 which is approximately semicircular shaped and which is mounted on a support 454 is located about the periphery of turntable 432. The lateral periphery of turntable 432, as best shown in FIG. 11, has a V-shaped groove 482 therein. Located in groove 482 is a urethane V-belt 484. As shown, belt 484 extends radially beyond turntable 432.

The periphery of turntable 432 forms a track portion 440 which is similar to track portion described above. However, in this embodiment, lateral support surface 444 is formed by the flat outer surface of belt 484. As with turntable 332, the outer upper portion of turntable 432 forms vertical support surface 442.

Attached to the top of turntable 432 is a retaining disc 486. Retaining disc 486 is spaced from turntable 432 by spacers 488 through which suitable attaching bolts 490 pass. Spacers 486 are sized so that the distance between vertical support surface 442 and retaining disc 486 is slightly larger than the diameter of vertical support wheels 20 of pallet 12.

As shown best in FIG. 12, end 470a of inside track 408a is designed to provide a smooth transfer of pallet 12 from inside track 408a to track portion 440 of turntable 432. End 470a includes a beveled tail 476a at the end of lateral support surface 424a. End 470a also includes an angled portion 472a at which vertical support surface 422a ends. Angled portion 472a is spaced slightly from lateral support surface 444 of turntable 432 and is at an angle parallel to a tangent to lateral support surface 444. It should also be noted that retaining flange 428a includes an end 492a which is shaped similar to end 470a. Thus, end 492a terminates at a vertical tail 494a and laterally at an angled portion 496a.

In operation, turntable 432 functions similar to turntable 332 described above. Thus, as vertical support wheels 20 of pallet 12 travel along vertical support surface 422, wheels 20 are easily transferred from angled portion 472a to vertical support surface 442 of track portion 440 as turntable 432 rotates. It should be noted that wheels 20 are also transferred easily and smoothly from beneath retaining flange 428a to a position beneath retaining disc 486 of turntable 432 in a similar manner. With this construction, vertical support wheels 20 are held between retaining disc 486 and vertical support surface 442 while pallet 12 is moved by turntable 432.

As lateral support wheels 22 of pallet 12 travel along lateral support surface 424a of inside track of 408a, lateral support wheels 22 reach beveled tail 476a. Lateral support wheels 22 then travel off the end of beveled tail 476a and engage lateral support surface 444 of V-belt 484. As V-belt 484 is somewhat resilient, this transfer occurs relatively smoothly. It should also be noted that the resiliency of V-belt 484 provides a positive contact of lateral support wheels 22 as lateral support wheels 22 are located between curb 450 and lateral support surfaces 444 while turntable 432 rotates.

After rotation of pallet 12 by turntable 432, the transfer of pallet 12 to inside track 408b occurs in the same manner described above for the transfer of pallet 12 from inside track 408a to track portion 440, but in the reverse order. The similar features of end 470b of inside track 408b have been identified in FIG. 11 with the same numerals as used with 470a, except the numbers are followed by "b".

Although the transfer mechanisms of the present invention have been described for transferring a pallet from two trackways which are parallel to one another, it should be appreciated by one of ordinary skill in the art that the transfer mechanisms of the present invention can be utilized to transfer a pallet from trackways at any angular orientation. In particular, the transfer mechanisms described above are equally suitable for trackways which are perpendicular to one another. It should also be appreciated that while a particular apparatus for driving the pallet along a trackway has been described, a number of different driving apparatuses could be used with the transfer mechanisms of the present invention. Pallets having a greater number of support wheels or different positioning of the support wheels are also possible. Cover 170 (depicted in FIG. 3) can also be suitably extended to cover transfer mechanisms 200 and 300.

Thus while the invention has been described with respect to exemplary embodiments thereof, it will be understood by those of ordinary skill in the art that these and other variations and modifications can be effected within the scope and spirit of the invention.

We claim:

1. A transfer mechanism for a conveyor system comprising:
   a first trackway having a longitudinal axis and a transfer end, said first trackway including an inside track and an outside track which are disposed parallel to one another in a horizontal plane, each said track having a top surface and a lateral surface;
   a second trackway having a longitudinal axis and a transfer end located adjacent to the transfer end of said first trackway, said second trackway including an inside track and an outside track which are disposed parallel to one another in a horizontal plane, each said track having a top surface and a lateral surface;

a pallet which is mounted for longitudinal movement on said tracks of said first and said second trackways, said pallet including at least three top rollers mounted for rotation about horizontal axes in engagement with the top surfaces of said inside or outside tracks such that said pallet is vertically supported on said trackway and three lateral rollers mounted for rotation about vertical axes in engagement with the lateral surfaces of said inside or outside tracks such that said pallet is laterally positioned on said trackway, said pallet further including a drive roller having an axial face which is movably mounted to said pallet;

an outside arcuate connecting track means for connecting said outside track of said first and second trackways including an arcuate connecting track having a top surface and a lateral surface which connects the transfer end of said outside track of said first trackway with the adjacent transfer end of said outside track of said second trackway, said arcuate track having a center axis of curvature;

a first drive means for driving said pallet along said first trackway towards said transfer end of said first trackway and a second drive means for driving said pallet along said second trackway away from said transfer end of said second trackway, said first drive means including a first rotating cylindrical drive shaft disposed underneath and parallel to said first trackway and said second drive means including a second rotating cylindrical drive shaft disposed underneath and parallel to said second trackway such that said axial face of said drive roller rotatably contacts an adjacent said cylindrical drive shaft; and a transfer means for moving said pallet from the transfer end of said first trackway to the adjacent transfer end of said second trackway including (a) a turntable having an axis of rotation and an inside track portion disposed about the axis of rotation of said turntable, said inside track portion including a top surface and a lateral surface, the axis of rotation of said turntable being coaxial with the center axis of said arcuate track and said inside track portion being located on said turntable such that said inside track portion is positionable by rotation of said turntable adjacent the transfer end of said inside track of said first trackway and of said second trackway;

(b) a rotating means for rotating said turntable about the axis of rotation to cyclically present said inside track portion of said turntable to the transfer end of said inside track of said first trackway and subsequently to the transfer end of said inside track of said second trackway; and (c) a transition means provided between the top surface of said turntable inside track portion and the adjacent transfer ends of said inside track for providing a gap therebetween at an acute angle to the longitudinal axis of said top surfaces whereby a smooth transition is provided as said respective top rollers move therebetween.

2. A transfer mechanism as claimed in claim 1 wherein said turntable includes a plurality of inside track portions disposed equidistantly around the axis of rotation of said turntable such that said turntable is suitably indexed to subsequently present said inside track portions of said turntable to said transfer ends of said inside track of said first trackway and second trackway, and wherein said transfer means further includes a stop means for stopping said pallet on the presented inside track portion of said turntable at the transfer end of said first trackway and a start means for engaging said pallet to said second drive means after said pallet has been moved around said arcuate track by the indexing movement of said turntable to the transfer end of said second trackway.

3. A transfer mechanism as claimed in claim 2 wherein said turntable has a plurality of inside track portions.

4. A transfer mechanism as claimed in claim 3 wherein the longitudinal axes of said first trackway and of said second trackway are parallel, and wherein said arcuate track is semicircular.

5. A transfer mechanism as claimed in claims 3 or 4 wherein said turntable is a regular polygon when viewed in radial cross section from the axis of rotation and the radial sides of said turntable comprise said inside track portions.

6. A transfer mechanism as claimed in claim 5 and further including a curb means for limiting the lateral movement of said lateral wheel of said pallet adjacent the lateral surface of said track portion.

7. A transfer mechanism as claimed in claim 6 wherein said curb means includes a curb lateral surface for each of said inside track portions, a respective said curb surface being parallel to a respective said track portion and spaced therefrom by a distance slightly larger than the outside diameter of said lateral wheel.

8. A transfer mechanism as claimed in claim 6 wherein there are a plurality of said pallets which are located on said first trackway and further including an escapement means for stacking said pallets adjacent the upstream side of the transfer end of said first trackway and for releasing one pallet at a time when an empty said track portion is presented adjacent said transfer end of said first trackway.

9. A transfer mechanism as claimed in claim 8 wherein two of said lateral wheels of said pallet engage the lateral surface of said inside track.

10. A transfer mechanism as claimed in claim 2 wherein said stop means includes a first cam means for rotating said drive roller to a neutral position and wherein said start means includes a second cam means for rotating said drive roller to a forward drive position.

11. A transfer mechanism as claimed in claim 1 wherein said inside track portion of said turntable extends completely around the axis of rotation of said turntable such that a portion of said inside track portion is always presented to said transfer ends of said inside track of said first trackway and said second trackway.

12. A transfer mechanism as claimed in claim 11 wherein said turntable is a circular disc and said inside track portion extends around the periphery of said disc.

13. A transfer mechanism as claimed in claim 12 wherein said rotating means continuously rotates said turntable such that said pallet is immediately transferred by said transfer means from said first trackway to said second trackway as soon as said pallet reaches the transfer end of said first trackway.

14. A transfer mechanism as claimed in claim 13 and further including a curb means for limiting the lateral movement of said lateral wheel of said pallet adjacent the lateral surface of said inside track portion.

15. A transfer mechanism as claimed in claim 14 wherein two of said lateral wheels of said pallet engage the lateral surface of said inside track.

16. A transfer mechanism as claimed in claim 14 wherein the lateral surface of said track portion of said turntable is formed of a resilient gripping surface.

17. A transfer mechanism as claimed in claim 16 wherein the resilient surface is urethane.

18. A transfer mechanism as claimed in claim 16 wherein said turntable includes a groove located around the periphery thereof and a belt is located in said groove and the outer periphery of said belt forms said resilient surface.

19. A transfer mechanism as claimed in claim 16 wherein said turntable further includes a retaining disc spaced above said track portion of said turntable whereby the vertical support wheels of said pallet are retained therebetween during rotation of said pallet.

20. A transfer mechanism as claimed in claim 1 wherein said transfer means also provides a gap between the lateral surfaces of said turntable inside track portions and the adjacent transfer ends of said inside track which allows a smooth transition as said respective lateral rollers move therebetween.

21. A transfer mechanism for a conveyor system wherein said conveyor system includes: a plurality of tracks having a top surface and a lateral surface including a first straight outside track, a second straight outside track, an arcuate track connecting the first outside track and the second outside track, a first inside track having a transfer end disposed adjacent and parallel to the first outside track and a second inside track having a transfer end adjacent the transfer end of the first inside track and disposed adjacent and parallel to the second outside track; a pallet mounted for movement on adjecent tracks including top rollers in rolling engagement with the top surfaces of adjacent tracks for vertically supporting the pallet and a drive roller having an axial face which is movably mounted to said pallet; and a drive means for driving the pallet along the first inside and outside tracks towards the first transfer end and for driving the pallet along the second inside and outside tracks away from the second transfer end, wherein said drive means includes a first rotating cylindrical drive shaft disposed underneath and parallel to said first inside and outside tracks and a second rotating cylindrical drive shaft disposed underneath and parallel to said second inside and outside tracks such that said axial face of said drive roller rotatably contacts an adjacent said cylindrical drive shaft; said transfer mechanism comprising:

two lateral wheels mounted to the pallet in rolling engagement with the lateral surface of the inside track and one lateral wheel mounted to the pallet in rolling engagement with the lateral surface of the outside track;

a turntable having an axis of rotation and a plurality of straight inside track portions disposed around the periphery thereof, said track portions having a top surface and a lateral surface and being located on said turntable such that rotation of said turntable sequentially brings each track portion into a coplanar relationship first with the transfer end of the first inside track and subsequently with the transfer end of the second inside track;

a motor means for rotatably indexing said turntable about the axis of rotation to sequentially present one said track portion coextensive with the transfer end of the second inside track;

a stop means for stopping the pallet on the presented track portion of said turntable at the transfer end of the first inside track;

a start means for engaging the pallet to the drive means for movement along the second inside and outside tracks after the pallet has been moved along the arcuate track by the indexing movement of said turntable to the transfer end of the second inside track; and a transition means provided between the top surfaces of said turntable track portions and the adjacent transfer ends of said inside tracks for providing a gap at an acute angle to the longitudinal axis of said top surfaces whereby a smooth transition is provided as said respective top rollers move therebetween.

22. A transfer mechanism as claimed in clain 21 wherein the arcuate track is semicircular and the first and second inside tracks are parallel to one another, wherein said turntable includes four track portions and wherein said motor means indexes said turntable in one-fourth turn increments.

23. A transfer mechanism as claimed in claim 22 wherein said turntable is square in radial cross section from the axis of rotation and the radial sides of said turntable comprise said four track portions.

24. A transfer mechanism as claimed in claim 23 and further including a curb means for limiting the lateral movement of said two lateral wheels when the pallet is adjacent said track portion.

25. A transfer mechanism as claimed in claim 24 wherein said curb means includes four curb lateral surfaces parallel respectively to one said lateral surface of said four track portions, said curb lateral surfaces being spaced from a respective track portion lateral surface by a distance slightly larger than the outside diameter of said lateral wheels.

26. A transfer mechanism as claimed in claim 21 wherein a plurality of pallets are located on the first inside and outside tracks and further including an escapement means for stacking the pallets adjacent the upstream side of the transfer end of the first inside track and for releasing one pallet at a time when an empty said track portion is presented adjacent the transfer end of the first inside track.

27. A transfer mechanism as claimed in claim ′1 wherein said stop means includes a moving means for moving the drive roller of the pallet to a neutral position.

28. A transfer mechanism as claimed in claim 27 wherein said start means includes a second moving means for moving the drive roller of the pallet to a forward drive position.

29. A transfer mechanism as claimed in claim 21 and further including a curb means for limiting the lateral movement of said two lateral wheels when the pallet is adjacent said track portion.

30. A transfer mechanism as claimed in claim 21 wherein said transfer means also provides a gap between the lateral surfaces of said turntable track portions and the adjacent transfer ends of said inside tracks which allows a smooth transition as said respective lateral rollers move therebetween.

* * * * *